UNITED STATES PATENT OFFICE 1,989,569

CHROMIFEROUS DYESTUFF AND PROCESS OF MAKING SAME

Fritz Straub, Basel, and Hermann Schneider, Riehen, near Basel, Switzerland, assignors to the firm of Society of Chemical Industry in Basle, Basel, Switzerland No Drawing. Application March 29, 1934, Serial No. 718,082. In Switzerland April 4, 1933

12 Claims. (Cl. 260—12)

This invention relates to the manufacture of new chromiferous dyestuffs from mixtures of azo-dyestuffs capable of being chromed, which contain at least one azo-dyestuff of the general formula:

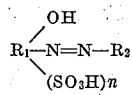

in which $R_1$ is a naphthalene radical, $R_2$ a naphthol radical and $n$ is 1—3, and wherein the hydroxyl and the azo-groups are in ortho-position to each other, by treating these mixtures with a complex compound produced by the action of an organic compound containing hydroxyl-groups on an alkaline suspension of chromium hydroxide.

The mixtures of azo-dyestuffs capable of being chromed which may be used as parent materials for this invention may contain, besides one or more azo-dyestuffs of the above general formula, one or more other azo-dyestuffs capable of being chromed.

The azo-dyestuffs of the above general formula may be obtained, for example, from diazotized 1-amino-2-naphthol-4-sulfonic acid, diazotized 2-amino-1-naphthol-4-sulfonic acid, 6-bromo-, or 6-chloro- or 6-nitro-1-diazo-2-naphthol-4-sulfonic acid, diazotized 2-amino-1-naphthol 4,8 disulfonic acid or diazotized 2-amino-1-naphthol-4,6-disulfonic acid and 1- or 2-naphthol or a substitution product thereof, such as chloro-, bromo-, methyl- and alkoxy-naphthols; the other azo-dyestuffs capable of being chromed may be, for example, those obtained from diazotized aromatic amines of the benzene or naphthalene series and any desired coupling component for example arylamine, a phenol or a compound whose carbon atom capable of being coupled belongs to a heterocyclic ring or an open chain. Coupling components whose carbon atom capable of being coupled belongs to a heterocyclic ring are, for example, pyrazolones, hydroxyquinolines and barbituric acids, while acetoacetic acid derivatives and benzoyl-acetic acid-ortho-carboxylic acids are coupling components, of which the carbon atom capable of being coupled belongs to an open chain.

The treatment of the mixture of azo-dyestuffs capable of being chromed with such complex compounds as are obtainable by the action of a compound containing hydroxyl-groups on an alkaline suspension of chromium hydroxide, for example polyhydric alcohols and phenols (for instance glycerin, glycol, gallic acid), tanning agents (such as tannin), sugars, cellulose derivatives (for instance sulfite waste liquor), as well as lignins, may be conducted, for example, by heating together in an open vessel or under pressure and in presence or absence of a suitable addition, such as a soluble inorganic or organic salt or some other substance, a chromium salt, an excess of alkali (for instance caustic soda solution or caustic potash solution or a mixture thereof), the organic compound containing hydroxyl-groups and the mixed azo-dyestuffs capable of being chromed; or the mixture of the azo-dyestuffs capable of being chromed is heated in like manner with the complex compound which is produced by the action of the organic compound containing hydroxyl groups on the alkaline suspension of chromium hydroxide.

The proportion to each other of the azo-dyestuffs capable of being chromed present in the mixture, as well as the proportion of these azo-dyestuffs to the alakline chroming agent or the proportion of the alkaline chroming agent to the organic compound containing hydroxyl-groups or the proportion of the alkalies to each other in the case when a mixture of alkalies is used, may vary within wide limits; moreover, the duration of the treatment and also the concentration of the alkali may be varied in many ways.

Particularly valuable dyestuffs are obtained when the parent material is a mixture of azo-dyestuffs, capable of being chromed, which comprises at least one azo-dyestuff capable of being chromed of the formula

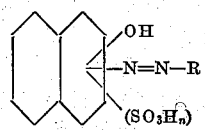

where the hydroxyl and the azo-groups are in ortho-position to each other and $n=1$—3, and R is a naphthol residue, for in this case dyestuffs dyeing navy-blue are obtained which, as compared with the dyestuffs of this group hitherto known, obtained by other processes and dyeing animal fibres in similar tints, dye deep tints which are level and in every respect fast, particularly to rubbing, and at the same time dyestuffs of the above formula serving as parent materials are very easily accessible.

The chromium compounds which can be made by this invention are particularly suitable for dyeing animal fibres, such as, for instance wool and silk. For dyeing wool there are advantageously used the process of U. S. A. Patent No. 1,903,884 or dye-baths containing an aromatic acid besides an inorganic acid.

The following examples illustrate the invention, the parts being by weight unless otherwise stated; the ratio of parts by volume to parts by weight is that which exists between the kilogramme and the litre.—

Example 1

208 parts of the dyestuff of the formula

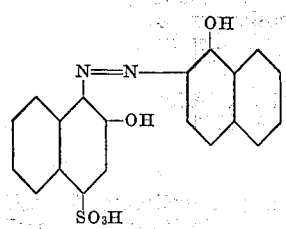

from diazotized 1-amino-2-oxynaphthalene-4-sulfonic acid and 1-oxynaphthalene (mono-sodium salt) and 208 parts of the azo dyestuff of the formula

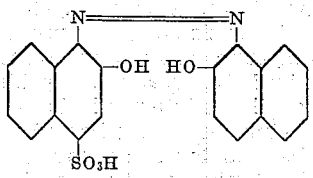

from diazotized 1-amino-2-hydroxynaphthalene-4-sulfonic acid and 2-oxynaphthalene (mono-sodium salt) are stirred together with 1300 parts of water and the mixture is mixed with a glycerin chromite solution made from 625 parts of chromium hydroxide paste, corresponding with 87.4 parts of $Cr_2O_3$, 120 parts of glycerin of 90 per cent. strength and 300 parts of caustic alkali. The whole is stirred and heated, first for 2–3 hours at 75–85° C., and then for 2–3 hours at 90–100° C. It is now diluted with cold water to 4000 parts, dilute hydrochloric acid is added until there is only weak alkalinity due to sodium carbonate and the dyestuff is salted out with common salt; or the solution is filtered from a small proportion of impurities and evaporated to dryness in a vacuum.

The freely soluble blue chromiferous dyestuff thus obtained dyes wool in a bath acid with organic acid and sulfuric acid navy blue tints of excellent fastness and good appearance by artificial light.

Instead of using the separated azo-dyestuffs, it is possible to treat directly with glycerin chromite the alkaline mixtures obtained by the coupling operation in the production of the azo-dyestuffs.

Example 2

380 parts of a fresh chromium hydroxide paste of 14 per cent. strength, corresponding with 53.2 parts of $Cr_2O_3$, 40 parts of sugar and 650 parts of caustic soda solution of 30 per cent. strength are stirred together and then gently heated to 75–80° C. until everything has dissolved.

After cooling to 50° C., there are introduced into the mixture 353 parts of the azo-dyestuff from diazotized 1-amino-2-hydroxynaphthalene-4-sulfonic acid and 2-hydroxynaphthalene (mono-sodium salt) in the form of a paste of about 30 per cent. strength and 66 parts of the azo-dyestuff of the formula

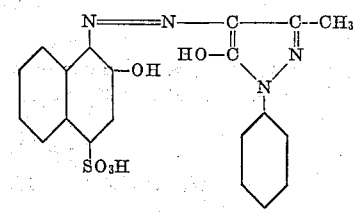

from diazotized 1-amino-2-hydroxynaphthalene-4-sulfonic acid and 1-phenyl-3-methyl-5-pyrazolone (mono-sodium salt). While stirring well, the whole is heated in the water-bath for 3 hours at 75–80° C. and then for a further 8 hours at 80–90° C. The bluish-black mixture is now diluted with water to 3000 parts by volume and neutralized with hydrochloric acid of about 5 per cent. strength. After filtering from a small quantity of impurities the new chromiferous dyestuff is salted out with common salt.

It dyes wool in a bath acid with organic acid and sulfuric acid navy blue tints of very good fastness.

Example 3

Into 700 parts of caustic soda solution of 30 per cent. strength there are introduced 380 parts of chromium hydroxide paste, corresponding with 53.2 parts of $Cr_2O_3$, and 42 parts of sugar, and the mixture is heated, while stirring, to 75–80° C. After dilution with 300 parts of water there are added to this chromite solution 310 parts of the azo-dyestuff from diazotized 1-amino-2-hydroxynaphthalene-4-sulfonic acid and 2-hydroxynaphthalene (mono-sodium salt) and 118 parts of the azo-dyestuff of the formula

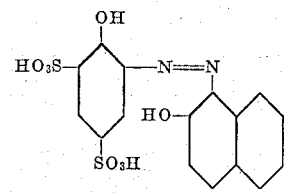

from 2-amino-1-hydroxybenzene-4:6-disulfonic acid and 2-hydroxynaphthalene (mono-sodium salt) whereupon, while stirring, the mixture is heated for 3 hours at 75–80° C. and then for 8 hours at 80–85° C. After dilution with water to 3000 parts by volume the whole is neutralized with hydrochloric acid of 5 per cent. strength and evaporated to dryness in a vacuum, if desired after filtration from a small quantity of impurities.

The chromiferous dyestuff thus obtained dyes wool in a bath acid with organic acid and sulfuric acid deep navy blue tints of excellent fastness.

Example 4

81 parts of paste of the azo-dyestuff from diazotized 1-amino-2-hydroxynaphthalene-4-sulfonic acid and 2-hydroxy-naphthalene, containing 15.76 parts of dyestuff, and 9.4 parts of the mono-azo-dyestuff of the formula

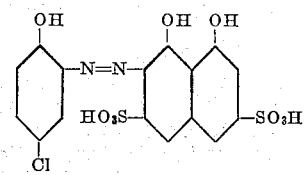

from diazotized 4-chloro-2-amino-1-hydroxybenzene and 1:8-dihydroxynaphthalene-3:6-disulfonic acid, are stirred with 10 parts of caustic soda solution of 30 per cent. strength and the mixture is further mixed with a chromite solution prepared from 3.6 parts of $Cr_2O_3$ in the form of an aqueous hydroxide paste, 80 parts of caustic soda solution of 30 per cent. strength and 6 parts of glycerin. While stirring well, the whole is heated for 5–6 hours at 80° C. and then for 2–3 hours at 90° C. and then diluted to about 500 parts. The blue solution is neutralized with strongly diluted sulfuric acid, filtered and evaporated to dryness in a vacuum. The new chromiferous dyestuff thus obtained is in the form of a violet-black powder which dissolves in water and sodium carbonate solution of 10 per cent. strength to reddish blue solution and in caustic soda solution of 10 per cent. strength and concentrated sulfuric acid to blue solutions. It dyes wool in a sulfuric acid bath or, more advantageously, in a bath acid with organic acid and sulfuric acid blue to navy blue tints of very good fastness.

Example 5

7.88 parts of the azo-dyestuff from diazotized 1-amino-2-hydroxynaphthalene-4-sulfonic acid and 2-hydroxynaphthalene and 4.74 parts of the azo-dyestuff of the formula

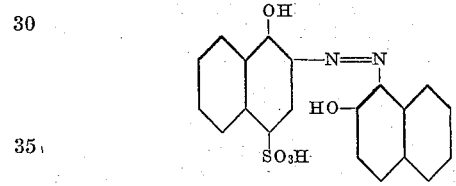

from diazotized 2-amino-1-hydroxynaphthalene-4-sulfonic acid and 2-hydroxynaphthalene, both dyestuffs in the form of a paste of about 25 per cent. strength, are stirred with 6 parts of caustic soda solution of 30 per cent. strength and then with a glycerin chromite solution, containing 2.3 parts of $Cr_2O_3$, 20 parts of potassium hydroxide and 5 parts of glycerin. This mixture is heated, while stirring, for 6 hours at 80° C. and then for 3 hours at 90° C. It is then diluted with about 400 parts of hot water, boiled for a short time, filtered and the filtrate is mixed with common salt and neutralized with strongly diluted mineral acid to precipitate the new chromium compound. When dry it is a violet-black powder, soluble in water to a blue solution having red dichroism. In sodium carbonate solution of 10 per cent. strength it dissolves sparingly to a blue solution; in caustic soda solution of 10 per cent. strength to a violet solution and in concentrated sulfuric acid to a blue solution.

It dyes wool in a bath acid with organic acid and sulfuric acid blue to navy blue tints of excellent fastness.

Example 6

20.8 parts of the azo-dyestuff from diazotized 1-amino-2-hydroxynaphthalene-4-sulfonic acid and 1-hydroxynaphthalene and 20.8 parts of the azo-dyestuff from diazotized 1-amino-2-hydroxynaphthalene-4-sulfonic acid and 2-hydroxynaphthalene are introduced into a sodium chromite solution, freshly prepared by stirring and boiling for a short time 80 parts of a chromium hydroxide paste of 8 per cent. strength, corresponding with 6.4 parts of $Cr_2O_3$, 10 parts of glycerin of 90 per cent. strength and 160 parts of caustic soda solution of 30 per cent. strength. To this dyestuff mixture there are added 50 parts of water and the whole is heated, while stirring for 6 hours at 80–90° C. and for a further 2 hours at 90–100° C. After dilution with cold water to make 600 parts by volume the mixture is neutralized with strongly diluted hydrochloric acid and evaporated to dryness in a vacuum. The new chromiferous dyestuff is obtained in the form of a bronze violet-black powder. It dissolves in water and in a solution of sodium carbonate of 10 per cent. strength to a blue solution with red dichroism. In caustic soda solution of 10 per cent. strength it is dissolved only in traces to a violet solution. Concentrated sulfuric acid dissolves it to a greenish blue-black solution. It dyes wool in a bath acid with organic acid and sulfuric acid navy blue tints of excellent fastness and of very good appearance by artificial light.

Example 7

Into a freshly prepared solution of potassium chromite produced from 66 parts of a chromium hydroxide paste of 8 per cent. strength, corresponding with 5.3 parts of $Cr_2O_3$, 42 parts of caustic potash of 90 per cent. strength and 10 parts of sugar, there are introduced 25 parts of the azo-dyestuff from diazotized 1-amino-2-hydroxynaphthalene-4-sulfonic acid and 2-hydroxynaphthalene, in the form of a paste of 20 per cent. strength, and 16.6 parts of the azo-dyestuff from diazotized 1-amino-2-hydroxynaphthalene-4-sulfonic acid and 1-hydroxynaphthalene. The mixture is heated, while stirring, for 8 hours at 80–90° C. and then diluted with 300 parts of cold water, neutralized with strongly diluted mineral acid and mixed with common salt to precipitate the new chromiferous dyestuff. When dry the latter is a violet-grey powder, soluble in water, sodium carbonate solution of 10 per cent. strength and caustic soda solution of 10 per cent. strength to blue solutions. In concentrated sulfuric acid it dissolves to a blackish blue solution. It dyes wool in a bath acid with organic acid and sulfuric acid very fast navy blue tints.

Example 8

A sodium chromite solution made from 62 parts of a chromium hydroxide paste of 8 per cent. strength, corresponding with 5 parts of $Cr_2O_3$, and 133 parts of a caustic soda solution of 30 per cent. strength is mixed with 12 parts of sulfite cellulose liquor. Into this mixture are stirred 33.3 parts of the azo-dyestuff from diazotized 1-amino-2-hydroxynaphthalene-4-sulfonic acid and 2-oxynaphthalene, in the form of a paste of 20 per cent. strength, and 8.3 parts of the azo-dyestuff from diazotized 1-amino-2-hydroxy-naphthalene-4-sulfonic acid and 1-hydroxynaphthalene and the whole is heated, while stirring, for 8–9 hours at 80–90° C. It is then diluted with cold water to 600 parts by volume (if this has not already been done) and neutralized with strongly diluted sulfuric acid. The solution thus obtained is filtered from a small quantity of insoluble matter and the new chromiferous dyestuff is salted out from the filtrate. After drying, it is a violet-black powder, which dissolves in water, sodium carbonate solution of 10 per cent. strength and caustic soda solution of 10 per cent. strength to blue solutions. In concentrated sulfuric acid it dissolves to a blackish-blue solution. The dyestuff dyes wool in a bath acid with organic acid and sulfuric acid navy blue tints of good properties

Example 9

20.8 parts of the azo-dyestuff from diazotized 1-amino-2-hydroxynaphthalene-4-sulfonic acid and 2-hydroxynaphthalene in the form of a paste of 20 per cent. strength, and 19.1 parts of the azo-dyestuff of the formula

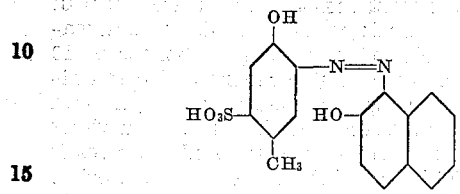

from diazotized 1-methyl-3-amino-4-hydroxybenzene-6-sulfonic acid and 2-hydroxynaphthalene are introduced into a potassium chromite solution, prepared from 65 parts of a chromium hydroxide paste of 8 per cent. strength, corresponding with 8.1 parts of $Cr_2O_3$, 48 parts of caustic potash of 90 per cent. strength and 12 parts of gallic acid. This mixture is heated while stirring for 6 hours at 80–90° C and then for 2 hours at 100° C. It is then diluted to 600 parts by volume with cold water, neutralized with strongly diluted mineral acid and mixed with common salt to precipitate the new chromiferous dyestuff. After filtration and drying, the dyestuff is a violet-black powder, soluble in water, sodium carbonate solution of 10 per cent. strength and caustic soda solution of 10 per cent. strength to violet solutions. In concentrated sulfuric acid it dissolves to a blue solution showing red dichroism. The dyestuff dyes wool in a bath acid with organic acid and sulfuric acid navy blue tints of good properties of fastness.

Example 10

Into a freshly prepared sodium chromite solution consisting of 52 parts of a chromium hydroxide paste of 8 per cent. strength, corresponding with 4.1 parts of $Cr_2O_3$, 73 parts of caustic soda solution of 30 per cent. strength and 7 parts of sugar, there are introduced 12.5 parts of the azo-dyestuff from diazotized 1-amino-2-hydroxynaphthalene-4-sulfonic acid and 1-hydroxynaphthalene, as well as 7.6 parts of the azo-dyestuff from diazotized 1-methyl-3-amino-4-hydroxybenzene-6-sulfonic acid and 2-hydroxynaphthalene. The mixture is heated, while stirring, for 8–9 hours at 80–90° C. then diluted with 200 parts of cold water, and neutralized with weak diluted formic acid. There is obtained a solution which is filtered from impurities and evaporated to dryness in a vacuum. The new chromiferous dyestuff is thus obtained in the form of a violet black powder. It dissolves in water and in sodium carbonate solution of 10 per cent. strength to blue, red-dichroic solutions. In caustic soda solution of 10 per cent. strength it dissolves to a reddish blue solution and in concentrated sulfuric acid to a blackish-green solution. It dyes wool in a bath acid with organic acid and sulfuric acid very fast navy blue tints.

Example 11

A potassium chromite solution is prepared from 80 parts of a chromium hydroxide paste of 8 per cent. strength, corresponding with 6.4 parts of $Cr_2O_3$, 100 parts of caustic potash solution of 50 per cent. strength and 12 parts of glycerin. There are added to this solution 20.8 parts of the azo-dyestuff from diazotized 1-amino-2-hydroxynaphthalene-4-sulfonic acid and 2-hydroxynaphthalene, as well as 21.5 parts of the reduced azo-dyestuff of the formula

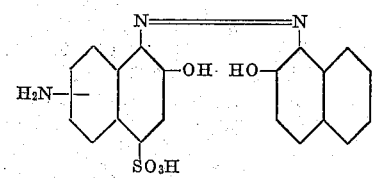

from the nitrated diazo-compound of 1-amino-2-hydroxynaphthalene-4-sulfonic acid and 2-hydroxynaphthalene. The mixture is heated, while stirring for 6 hours at 80–90° C., and then for two hours at 90–100° C., whereafter it is diluted with 500 parts of cold water, filtered, neutralized with strongly diluted mineral acid and mixed with common salt to precipitate the new chromiferous dyestuff. When dry, the latter is black powder, easily soluble in water to a blue solution. In sodium carbonate solution of 10 per cent. strength and caustic soda solution of 10 per cent. strength it dissolves only in traces, in the first case to a blue solution and in the second case to a violet solution. In concentrated sulfuric acid it dissolves to a black-blue solution. It dyes wool in a bath acid with organic acid and sulfuric acid blue-black tints of excellent fastness.

Example 12

67 parts of a chromium hydroxide paste of 8 per cent. strength, corresponding with 5.36 parts of $Cr_2O_3$, 120 parts of caustic soda lye of 30 per cent. strength and 15 parts of sugar are heated together, while stirring, until everything has dissolved. There are then added 33.3 parts of the azo-dyestuff from diazotized 1-amino-2-hydroxynaphthalene-4-sulfonic acid and 2-hydroxynaphthalene, in the form of a paste of 20 per cent. strength and also 9.2 parts of the azo-dyestuff of the formula

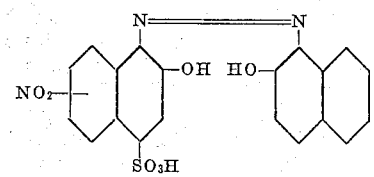

from the nitrated diazo-compound of 1-amino-2-hydroxynaphthalene-4-sulfonic acid and 2-hydroxynaphthalene. The whole is heated for 8 hours at 80–90° C. After dilution with cold water to make it up to 600 parts by volume, the mass is neutralized with strongly diluted sulfuric acid and the new chromiferous dyestuff is precipitated by addition of common salt. It is a violet black powder, which dissolves in water to a blackish-blue solution having red dichroism. In sodium carbonate solution of 10 per cent. strength and in caustic soda solution of 10 per cent. strength it is soluble only in traces. In concentrated sulfuric acid it dissolves to a blackish-blue solution. It dyes wool in a bath acid with organic acid and sulfuric acid excellent, fast, dark navy blue tints.

Example 13

27.7 parts of the azo-dyestuff from diazotized 1-amino-2-hydroxynaphthalene-4-sulfonic acid and 2-hydroxynaphthalene, as well as 13.2 parts of the azo-dyestuff of the formula

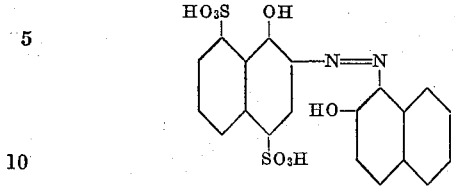

from diazotized 2-amino-1-hydroxynaphthalene-4:8-disulfonic acid and 2-hydroxynaphthalene, are stirred into a sodium chromite solution which has been freshly prepared from 75 parts of a chromium hydroxide paste of 8 per cent. strength, corresponding with 6 parts of $Cr_2O_3$, 120 parts of caustic soda solution of 30 per cent. strength and 10 parts of glycerin. The whole is heated, while stirring, for 6 hours at 80–90° C. and then for a further hour at 90–100° C. The blue mass is then diluted with 500 parts of cold water, neutralized with acetic acid and evaporated to dryness in a vacuum. The new chromiferous dyestuff is a black violet powder which dissolves in water, in sodium carbonate solution of 10 per cent. strength and in caustic soda solution of 10 per cent. strength to a reddish-blue solution having red dichroism. In concentrated sulfuric acid it dissolves to a blue solution. It dyes wool in a bath acid with organic acid and sulfuric acid very fast blue to navy blue tints.

Example 14

31.2 parts of the azo-dyestuff from diazotized 1-amino-2-hydroxynaphthalene-4-sulfonic acid and 2-hydroxynaphthalene, and 10.3 parts of the azo-dyestuff of the formula

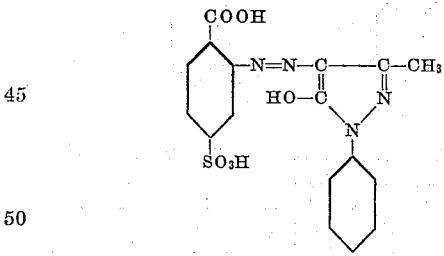

from diazotized 4-sulfo-2-amino-1-benzoic acid and 1-phenyl-3-methyl-5-pyrazolone are added to a freshly prepared potassium chromite solution, obtained by stirring and cooking a mixture of 75 parts of a chromium hydroxide paste of 8 per cent. strength, corresponding with 6 parts of $Cr_2O_3$, 35 parts of caustic potash of 90 per cent. strength and 10 parts of glycerin of 90 per cent strength. The mixture is heated while stirring for 8 hours at 80–90° C. and then diluted with 400 parts of cold water and neutralized with strongly diluted hydrochloric acid. The solution thus obtained is purified by filtration and the new chromiferous dyestuff is salted out. It is a black powder, soluble in water to a violet-black solution, which is strongly red dichroic; in sodium carbonate solution of 10 per cent. strength and in caustic soda solution of 10 per cent. strength it dissolves to bluish-black solutions and in concentrated sulfuric acid to a greenish blue-black solution. It dyes wool in a bath acid with organic acid and sulfuric acid dark navy blue tints of excellent properties.

Example 15

The chromite solution is prepared from 71 parts of a chromiumhydroxide paste of 8 per cent. strength, corresponding with 5.7 parts of $Cr_1O_3$. 21 parts of a caustic potash of 90 per cent. strength, 35 parts of a caustic soda solution of 30 per cent. strength and 11 parts of sugar, and to this solution there are added 30 parts of the azo-dyestuff from diazotized 1-amino-2-hydroxynaphthalene-4-sulfonic acid and 2-hydroxynaphthalene, as well as 12.5 parts of the azo-dyestuff from diazotized 1-amino-2-hydroxynaphthalene-4-sulfonic acid and 1-hydroxynaphthalene. The mixture is now heated, while stirring, for 6 hours at 80–90° C. and then for a further 2 hours at 90–100° C. The mass is cooled, diluted with water to 800 parts by volume, neutralized with strongly diluted mineral acid and mixed with common salt to precipitate the new chromiferous dyestuff. The latter when dry is a violet black powder, soluble in water to a blue solution which is red dichroic. In sodium carbonate solution of 10 per cent. strength and in caustic soda solution of 10 per cent. strength it dissolves only in traces. In concentrated sulfuric acid it dissolves to a blackish blue solution. It dyes wool in a bath acid with organic acid and sulfuric acid in excellent, fast blue to navy blue tints.

Example 16

75 parts of a chromium hydroxide paste of 8 per cent strength, corresponding with 6 parts of $Cr_2O_3$, and 14 parts of glycerin of 90 per cent strength, are stirred with 60 parts of caustic soda solution of 30 per cent strength and 22 parts of caustic potash of 90 per cent strength until the last-named has dissolved, and the mixture is then boiled until the chromium hydroxide has also passed into solution. Into this solution there are introduced 29.1 parts of the azo-dyestuff from diazotized 1-amino-2-hydroxynapthalene-4-sulfonic acid and 2-hydroxynapthalene in the form of a paste of 20 per cent strength, 11.1 parts of the azo-dyestuff from diazotized 1-methyl-3-amino-4-hydroxybenzene-6-sulfonic acid and 2-hydroxynaphthalene and 7.5 parts of crystallized sodium sulfate. The mixture is heated, while stirring well, for 6 hours at 80–90° C. and then for 2 hours at 100° C.; it is then diluted with cold water to 500 parts by volume and neutralized cautiously with strongly diluted hydrochloric acid; the new chromiferous dyestuff is salted out with common salt, filtered and dried.

It is a violet grey powder, soluble in water to a violet solution having red dichroism. In sodium carbonate solution of 10 per cent strength and in caustic soda solution of 10 per cent strength it dissolves to a red-violet solution in each case, and in concentrated sulfuric acid to a blue solution. It dyes wool in a bath acid with organic acid and sulfuric acid excellent, fast navy-blue tints.

Example 17

10.4 parts of the azo-dyestuff from diazotized 1-amino-2-hydroxynaphthalene-4-sulfonic acid and 1-hydroxynaphthalene as well as 11.7 parts of the azo-dyestuff from diazotized 2-amino-1-hydroxybenzene-4:6-disulfonic acid and 2-hydroxynaphthalene, are introduced into a freshly prepared chromite solution, obtained by stirring and cooling 52.5 parts of a chromium hydroxide paste of 8 per cent strength, corresponding with 4.2 parts of $Cr_2O_3$, 10 parts of glycerin of 90 per cent strength and 80 parts of caustic soda solution of 30 per cent strength. To this mixture there are added 6.7 parts of sodium oxalate and the whole is heated, while stirring, for about 6 hours at 80–90° C. and then for 2 hours at 90–100° C. It is then diluted with cold water to 300 parts by volume, neutralized with strongly diluted sulfuric acid and evaporated to dryness in a vacuum.

This new chromiferous dyestuff is thus obtained in the form of a violet-black powder. It dissolves in water to a blue, red-dichroic solution, in sodium carbonate solution of 10 per cent strength and in caustic soda solution of 10 per cent strength to blue violet solutions and in concentrated sulfuric acid to a blue black solution. It dyes wool in a bath acid with organic acid and sulfuric acid dark navy blue tints of excellent properties of fastness.

What we claim is:—

1. Process for the manufacture of chromiferous dyestuffs from mixtures of azo-dyestuffs capable of being chromed, which contain at least one azo-dyestuff of the general formula

wherein $R_1$ is a naphthalene radical, $R_2$ a naphthol radical and $n$ means 1—3, and wherein the hydroxyl- and the azo-group are in ortho-position to each other, consisting in reacting these mixtures of dyestuffs with such complex compounds which are produced by the action of organic compounds containing alcoholic hydroxyl-groups on alkaline suspensions of chromium hydroxide.

2. Process for the manufacture of chromiferous dyestuffs from mixtures of azo-dyestuffs capable of being chromed, which contain at least one azo-dyestuff of the general formula

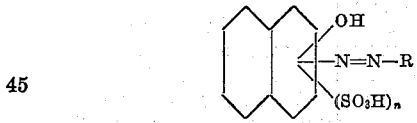

wherein the hydroxyl- and the azo-group stand in ortho-position to each other, $n$ means 1—3, and R is a naphthol radical, consisting in reacting these mixtures of dyestuffs with which such complex compounds which are produced by the action of organic compounds containing alcoholic hydroxyl-groups on alkaline suspensions of chromium hydroxide.

3. Process for the manufacture of chromiferous dyestuffs from mixtures of azo-dyestuffs capable of being chromed, which contain at least one azo-dyestuff of the general formula

wherein the hydroxyl- and the azo-group stand in ortho-position to each other, and R is a naphthol radical, consisting in reacting these mixtures of dyestuffs with such complex compounds which are produced by the action of organic compounds containing alcoholic hydroxy-groups on alkaline suspensions of chromium hydroxide.

4. Process for the manufacture of chromiferous dyestuffs from mixtures of azo-dyestuffs capable of being chromed, which contain at least one azo-dyestuff of the general formula

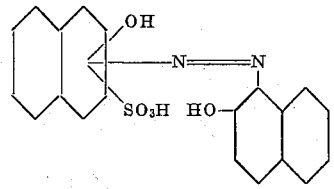

wherein the hydroxyl- and the azo-group stand in ortho-position to each other, consisting in reacting these mixtures of dyestuffs with such complex compounds which are produced by the action of organic compounds containing alcoholic hydroxyl-groups on alkaline suspensions of chromium hydroxide.

5. Process for the manufacture of chromiferous dyestuffs from mixtures of azo-dyestuffs capable of being chromed, which contain an azo-dyestuff of the formula

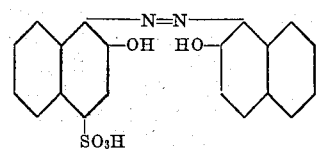

consisting in reacting these mixtures of dyestuffs with such complex compounds which are produced by the action of organic compounds containing alcoholic hydroxyl groups on alkaline suspensions of chromium hydroxide.

6. Process for the manufacture of chromiferous dyestuffs from mixtures of azo-dyestuffs capable of being chromed, which contain an azo-dyestuff of the formula

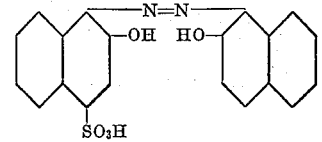

consisting in reacting these mixtures of dyestuffs with such complex compounds which are produced by the action of glycerin on alkaline suspensions of chromium hydroxide.

7. Chromiferous dyestuffs, obtained from mixtures of azo-dyestuffs capable of being chromed, which contain at least one azo-dyestuff of the general formula

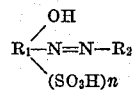

wherein $R_1$ is a naphthalene radical, $R_2$ a naphthol radical, and $n$ means 1—3, and wherein the hydroxyl- and the azo-group are in ortho-position to each other, by reacting these mixtures of the dyestuffs with such complex compounds, which are produced by the action of organic compounds containing alcoholic hydroxyl-groups on alkaline suspensions of chromium hydroxide, which products represent grey, violet and black powders dissolving in water to violet, blue and violet black solutions, and dyeing wool blue, navy-blue and blue-black tints of very good fastness properties and excellent appearance in the artificial light.

8. Chromiferous dyestuffs, obtained from mixtures of azo-dyestuffs capable of being chromed, which contain at least one azo-dyestuff of the general formula

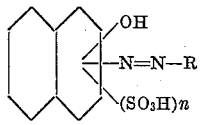

wherein the hydroxyl- and the azo-group stand in ortho-position to each other, $n$ means 1—3, and R is a naphthol radical, by reacting these mixtures of dyestuffs with such complex compounds which are produced by the action of organic compounds containing alcoholic hydroxyl-groups on alkaline suspensions of chromium hydroxide, which products represent grey, violet and black powders dissolving in water to violet, blue and violet-black solutions, and dyeing wool blue, navy-blue and blue-black tints of very good fastness properties and excellent appearance in the artificial light.

9. Chromiferous dyestuffs, obtained from mixtures of azo-dyestuffs capable of being chromed, which contain at least one azo-dyestuff of the general formula

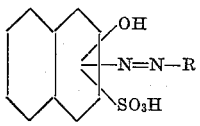

wherein the hydroxyl- and the azo-group stand in ortho-position to each other, and R is a naphthol radical by reacting these mixtures of dyestuffs with such complex compounds which are produced by the action of organic compounds containing alcoholic hydroxyl-groups on alkaline suspensions of chromium hydroxide, which products represent grey, violet and black powders dissolving in water to violet, blue and violet-black solutions, and dyeing wool blue, navy-blue and blue-black tints of very good fastness properties and excellent appearance in the artificial light.

10. Chromiferous dyestuffs, obtained from mixtures of azo-dyestuffs capable of being chromed, which contain at least one azo-dyestuff of the general formula

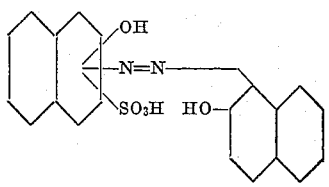

wherein the hydroxyl- and the azo-group stand in ortho-position to each other, by reacting these mixtures of the dyestuffs with such complex compounds which are produced by the action of organic compounds containing alcoholic hydroxyl-groups on alkaline suspensions of chromium hydroxide, which products represent grey, violet and black powders dissolving in water to violet, blue and violet-black solutions, and dyeing wool blue, navy-blue and blue-black tints of very good fastness properties and excellent appearance in the artificial light.

11. Chromiferous dyestuffs, obtained from mixtures of azo-dyestuffs capable of being chromed, which contain an azo-dyestuff of the formula

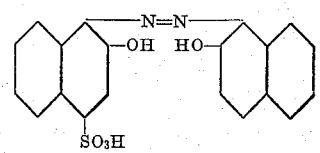

by reacting these mixtures of dyestuffs with such complex compounds which are produced by the action of organic compounds containing alcoholic hydroxyl-groups on alkaline suspensions of chromium hydroxide, which products represent grey, violet and black powders dissolving in water to violet, blue and violet-black solutions, and dyeing wool blue, navy-blue and blue-black tints of very good fastness properties and excellent appearance in the artificial light.

12. Chromiferous dyestuffs, obtained from mixtures of azo-dyestuffs capable of being chromed, which contain an azo-dyestuff of the formula

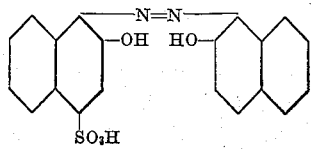

by reacting these mixtures of dyestuffs with such complex compounds which are produced by the action of glycerin on alkaline suspensions of chromium hydroxide, which products represent grey, violet and black powders dissolving in water to violet, blue and violet-black solutions, and dyeing wool blue, navy-blue and blue-black tints of very good fastness properties and excellent appearance in the artificial light.

FRITZ STRAUB.
HERMANN SCHNEIDER.